(12) United States Patent
Hammoud (10) Patent No.: US 10,907,640 B2
(45) Date of Patent: Feb. 2, 2021

(54) GAS TURBINE BLOWER/PUMP (71) Applicant: Omar Hammoud, Lorraine (CA)

(72) Inventor: Omar Hammoud, Lorraine (CA)

(73) Assignee: APGN INC., Blainville (CA)

( * ) Notice: Subject to any disclaimer, the term of this patent is extended or adjusted under 35 U.S.C. 154(b) by 0 days.

(21) Appl. No.: 15/044,316

(22) Filed: Feb. 16, 2016

(65) Prior Publication Data
US 2017/0234315 A1 Aug. 17, 2017

(51) Int. Cl.
F04D 25/02 (2006.01)
F04D 13/04 (2006.01)
F02C 3/04 (2006.01)
F04D 25/04 (2006.01)
F02C 3/22 (2006.01)
F01D 15/00 (2006.01)
F02C 3/10 (2006.01)
F01D 15/10 (2006.01)
F02C 6/18 (2006.01)

(52) U.S. Cl.
CPC ........... F04D 25/02 (2013.01); F01D 15/005 (2013.01); F01D 15/10 (2013.01); F02C 3/04 (2013.01); F02C 3/10 (2013.01); F02C 3/22 (2013.01); F02C 6/18 (2013.01); F04D 13/04 (2013.01); F04D 25/04 (2013.01); F05D 2220/32 (2013.01); F05D 2220/62 (2013.01); F05D 2240/35 (2013.01); Y02E 20/14 (2013.01); Y02T 50/678 (2013.01)

(58) Field of Classification Search
CPC .... F04D 25/02; F02C 6/18; F02C 7/32; F02C 7/36; F02C 3/10; F02C 3/103; F02C 6/10; F02C 7/08; F02C 7/10
See application file for complete search history.

(56) References Cited

U.S. PATENT DOCUMENTS 4,178,761 A * 12/1979 Schwartzman ......... F01K 25/10
60/648
4,313,301 A 2/1982 Belke et al.
4,813,228 A 3/1989 Hueller
5,119,624 A 6/1992 McKenna
6,269,625 B1 * 8/2001 Dibble ..................... F02C 3/20
60/39.12
6,363,706 B1 4/2002 Meister
(Continued)

FOREIGN PATENT DOCUMENTS

EP 0891482 B1 7/2003
WO WO 9736218 10/1997

OTHER PUBLICATIONS

Written Opinion issued in PCT/CA2016/000043, dated Oct. 18, 2016.
(Continued)

Primary Examiner — Craig Kim
(74) Attorney, Agent, or Firm — Eugene J. A. Gierczak; Miller Thomson LLP (57) ABSTRACT A low emission, high efficiency Gas Turbine engine operating on a combination of Natural Gas and Bio Gas as fuel, driving either a high efficiency turbo-blower or a high efficiency Turbo Pump system combined with heat recovery systems and in other embodiments is provided a generator of electricity or providing evaporative cooling from using the remaining waste heat in the exhaust gas.

17 Claims, 9 Drawing Sheets (56) References Cited

U.S. PATENT DOCUMENTS

| | | | | |
|---|---|---|---|---|
| 8,813,497 | B2* | 8/2014 | Hart | F01K 3/185 60/645 |
| 9,777,629 | B2* | 10/2017 | Nakamoto | F02C 6/04 |
| 2010/0186418 | A1* | 7/2010 | Beutin | F01D 15/10 60/802 |
| 2010/0219779 | A1* | 9/2010 | Bradbrook | F02C 3/113 318/153 |
| 2010/0293967 | A1* | 11/2010 | Liskow | F01D 15/005 62/6 |
| 2012/0102911 | A1 | 5/2012 | Dewis | |
| 2013/0139519 | A1* | 6/2013 | Kesseli | F02C 9/26 60/773 |
| 2014/0123624 | A1* | 5/2014 | Minto | F23N 5/18 60/39.281 |
| 2014/0373551 | A1* | 12/2014 | Kraft | F02C 6/16 60/772 |
| 2016/0105078 | A1* | 4/2016 | Santini | F02C 7/36 290/52 |

OTHER PUBLICATIONS

Annex to the European Search Report on European Patent Application EP 16 89 0136 dated Feb. 9, 2019.

* cited by examiner

Operating Cost - Gas Turbine Blowers/Pump

| State/Province | Florida | Texas | California | Ontario (Canada) | |
|---|---|---|---|---|---|
| Blower impeller input power | 636,500 | 636,500 | 636,500 | 636,500 | btu/hr |
| Blower impeller input power | 187 | 187 | 187 | 187 | kW |
| Gas Turbine input power (HHV) | 1,742,854 | 1,742,854 | 1,742,854 | 1,742,854 | btu/hr |
| Natural Gas Fuel Cost (HHV) | 0.67 | 0.55 | 0.98 | 0.71 | $/therm HHV |
| Operating Cost | $11.68 | $9.59 | $17.08 | $12.42 | $/hr |
| Operating Cost | $102,292 | $83,971 | $149,621 | $108,765 | $/yr |

Operating Cost - Electric Motor Blower/Pump

| State/Province | Florida | Texas | California | Ontario (Canada) | |
|---|---|---|---|---|---|
| Blower impeller input power | 636,500 | 636,500 | 636,500 | 636,500 | btu/hr |
| Blower impeller input power | 187 | 187 | 187 | 187 | kW |
| Blower system Electric Loss | 12% | 12% | 12% | 12% | % |
| Blower wire power input from Electric Grid | 212 | 212 | 212 | 212 | kW |
| Electric Power Cost from Electric Grid | 0.08 | 0.08 | 0.12 | 0.10 | $/kW-hr |
| Operating Cost | 17 | 16 | 25 | 21 | $/hr |
| Operating Cost | 148,773 | 139,475 | 223,160 | 185,967 | $/yr |
| Operating Cost Savings Gas vs Electric, $ | $46,482 | $55,504 | $73,539 | $77,202 | $/yr |
| Operating Cost Savings Gas vs Electric, % | 31% | 40% | 33% | 42% | |

FIG. 13

GAS TURBINE BLOWER/PUMP

FIELD OF INVENTION

This invention relates to Aeration Blowers and Pump technologies. More particular, the present invention relates to a Gas Turbine engine fueled by Natural gas or Bio gas, the byproduct of wastewater treatment, where this Gas turbine engine direct drives a blower or a pump, employing a recuperated heat in the Gas Turbine to increase the Gas Turbine Inlet temperature to 1800 to 2000 Deg F. and a heat exchanger cooling system or a electric generator system driven by the downstream system exhaust waste heat.

It is an aspect of this invention to combine in the same design the direct mechanical power from the Gas Turbine fueled by Natural gas and Bio gas to the impeller of a blower or a pump with heat recovery from the exhaust gas; all in one highly efficient system.

BACKGROUND

Blowers and Pumps are used in a variety of applications including water and wastewater treatment, food and beverage, oil and gas, power generation, pulp and paper and pharmaceutical industries. Such blowers deliver airflow at high volume and pressure typically lower than 1.0 atmospheres of discharge pressure. The pumps deliver low or high water flow at varying heads. In the past blowers and pumps have been driven by electric motors. Electric motors require electricity generated on site using a variety of electric co-generators or accessing this electricity from the electric grid. Electric-motor driven blowers and pumps require several complex electric components, including variable frequency drives, Sine wave fitters, Line Input Reactors, Harmonic Filters and power Transformers.

These electric components produce electric losses and waste heat leading to an estimated 12 to 15% energy loss.

In some occasions, reciprocating gas or diesel engines drive the blowers and pumps. These reciprocating engines are inefficient, noisy, and large in size, produce a large amount of waste heat and are difficult to retrofit them to meet the evolving emission standards. On the other hand, Gas Turbines have evolved over the years to being highly efficient, low in emissions as they are used in a variety of applications from aerospace, aviation and power generation. In some cases, Gas Turbine engines are used to drive high-pressure gas compressors that deliver natural gas, oxygen or nitrogen in pipelines, at multiple atmospheres discharge pressures. During the compression of gas, gas turbine exhaust heat and the compression heat energies are generated as byproducts and expelled as waste heat.

Thus, the wasted energy in the use of electric motors and the wasted energy in the use of reciprocating engines or Gas Turbine engines combined with the wasted energy by product of compression represent significant energy loss in the operation of compressors, blowers and pumps. Furthermore, biogas is a free byproduct of waste treatment, when treated properly, instead of being flared or dumped to the atmosphere, can be used alone or in a combination with natural gas to produce the fuel required for the gas turbine engine directly driving the blower or pump thereby reducing significantly the operating costs of the waste treatment facility. Recently, we started to see an emerging global trend to use the biogas as fuel to help wastewater treatment facilities achieve their goal of becoming energy neutral.

Various reciprocating engines or Gas Turbine Engines have heretofore been made in the prior art.

For example U.S. Pat. No. 9,140,267 discloses a compressor housing that defines a gas inlet flow path and a gas outlet and a rotatable impeller wheel between the gas inlet flow path and the gas outlet. An inner wall of the housing defines a surface in close proximity to radially outer edges of impeller wheel vanes that sweep across the surface as the wheel rotates. An opening is provided in the inner wall at the surface. A port is provided in the housing in gas communication with the opening for diverting gas in a direction away from the inlet flow path during relatively low flow conditions. A gas displacement device is disposed outside of the inlet flow path and connected to the port, wherein the pump is operable to remove gas selectively through the opening and the port in a direction away from the inlet flow path.

Another arrangement is disclosed in U.S. Pat. No. 8,506,237 which relates to a turbomachine that includes a radial-flow impeller and one or more of a variety of features that enhance the performance of machinery in which the turbomachine is used. For example, when the turbomachine a used in a dynamometer where one of the features is a variable-restriction intake that allows for adjusting flow rate to the impeller. An impeller shroud and a shroud guide each movable relative to the impeller. An exhaust diffuser facilitates an increase in the range of shaft power and the reduction of deleterious vibration and noise. The turbomachine can also include a unique impeller blade configuration that cooperates with the adjustable intake and the exhaust diffuser to enhance flow through the turbomachine.

U.S. Pat. No. 8,327,644 illustrates a micro gas turbine engine for use in a turbo heater or co-generation application is described. The micro gas turbine engine includes a fuel delivery system which minimizes the development of deposits in the air-fuel passageway. To this end, a fuel delivery channel formed between a fuel deflector and a slinger body is formed with a contoured or undulating surface. A fuel deflector ring is interposed between the fuel delivery channel and the stinger impeller to facilitate the flow of the air-fuel mixture into the combustion chamber.

Yet another centrifugal pump is shown in U.S. Pat. No. 8,240,976 which relates to a centrifugal pump housing including a rotatable impeller having radial blades and an axial diffuser having vanes angularly spaced downstream of said impeller by a cross-over gap formed within said pump housing so that the fluid subjected to the impeller must move through said cross-over gap to be driven into said axial diffuser, the improvement comprising at least a single, axial diffuser vane extension mounted circumferentially with said axial diffuser and extending into said cross-over gap for guiding the fluid flow from said impeller through the cross-over gap and driven to said axial diffuser, said diffuser vane extension being constructed designed and formed in structure with a tandem vane portion for imparting a twisting force to the fluid received from said impeller for minimizing any turbulence present in the fluid stream as it leaves the impeller whereby said pump exhibits a pump head curve that has been modified for eliminating flat or positive slopes as the flow-head curve becomes continuously rising toward shut-off.

U.S. Pat. No. 8,096,127 describes an exhaust turbo-supercharger is capable of preventing misalignment of the center of the rotating shaft of a supercharger turbine and the center of the rotating shaft of a supercharger compressor, or, misalignment of the center of the rotating shaft of the supercharger turbine, the center of the rotating shaft of the supercharger compressor, and the center of the rotating shaft of a power generator, due to the heat of exhaust gas; is capable of reducing vibration of these rotation axes; and is capable of improving the reliability of the entire supercharger. The exhaust turbo-supercharger has a casing that supports a turbine unit and a compressor unit. The lower end of the casing constitutes a leg portion, and the leg portion is fixed to a base placed on the floor. A power generator having a rotating shaft is connected to a rotating shaft of the turbine unit and the compressor unit.

Moreover U.S. Pat. No. 8,931,291 illustrates a system that includes a gas compressor including an engine, a compressor driven by the engine, and a vapor absorption cycle (VAC) system driven by waste heat from the compressor, wherein the VAC system is configured to cool at least one medium. In other embodiments is provided a method that includes generating waste heat while compressing a gas, driving a vapor absorption cycle (VAC) system with the waste heat, and cooling at least one medium via the VAC system.

Finally U.S. Pat. No. 746,813 relates to a centrifugal compressor is applied as an organic rankine cycle turbine by operating the machine in reverse. In order to accommodate the higher pressures when operating as a turbine, a suitable refrigerant is chosen such that the pressures and temperatures are maintained within established limits. Such an adaptation of existing, relatively inexpensive equipment to an application that may be otherwise uneconomical, allows for the convenient and economical use of energy that would be otherwise lost by waste heat to the atmosphere.

It is an object of this invention to provide an improved gas turbine engine and in particular to provide an improved aeration blower and pump.

It is an aspect of this invention to combine in the same design the direct mechanical power from the Gas Turbine fueled by Natural gas and Bio gas to the impeller of a blower or a pump with heat recovery from the exhaust gas; all in one highly efficient system.

It is an aspect of this invention to provide a unit having a first inlet and first outlet; a second inlet and second outlet; an impeller disposed between said first inlet and said first outlet; a gas turbine disposed between said second inlet and said second outlet; a combustion mixture introduced into said second inlet to drive said gas turbine and exhaust through said second outlet; an impeller disposed between said first inlet and said first outlet; and said gas turbine connected to said impeller so as to drive said impeller and move a fluid from said first inlet to said first outlet.

It is a further aspect of this invention to provide an integrated gas turbine unit comprising: a working fluid inlet and working fluid outlet; an impeller disposed between said working fluid inlet and said working fluid outlet; a combustor disposed between an inlet and outlet for combusting a mixture of air and biofuel to drive a turbine; and a shaft having an axis of rotation, said turbine and impeller coaxially connected to said shaft so as to move said working fluid.

It is a further aspect of this invention to provide a method of driving an impeller with a gas turbine comprising: coaxially connecting said impeller and turbine; rotatably driving said gas turbine by combusting a mixture of air and fuel so as to rotationally drive said turbine and impeller and produce an exhaust gas; and capturing waste heat from said exhaust gas to preheat said air upon reentry to the gas turbine at a higher pressure ratio of 4.5 compared to inlet and at high temperature between 1800 and 2000 Deg. F., at which stage the gas expands through the gas turbine and results in further moving of a working fluid by said impeller. The gas expanding through the gas turbine enters the power turbine at high pressure and temperature, rotating the said power turbine that in turn rotates at variable the shaft directly connected to the impeller of the blower and pump to deliver the working air of fluid.

These and other objects and features of the invention shall be described with the following drawings.

BRIEF DESCRIPTION OF THE DRAWINGS

The following detailed description will be better understood with reference to the accompany figures, wherein.

DETAILED DESCRIPTION OF SPECIFIC EMBODIMENTS

The same parts are marked throughout the figures with like numbers.

Two specific embodiments of the present invention will be described below. These embodiments are only exemplary of the present invention. It should be appreciated that in the development of any such actual implementation, as in engineering or design project, numerous detail decisions must be made to achieve the developer's specific goals which may vary from one embodiment to another.

The embodiments discussed below may include an optional gearbox 13 to reduce or increase rotor speed driven by free power turbine, an optional heat exchanger 27 and an optional electrical generator or cooling refrigerator 29 to recovery the wasted neat from the exhaust gas down stream from recuperator 60.

FIGS. 1 through 6 generally illustrate one embodiment of the invention relating to Gas Turbine unit or device 10 having a gas turbine module 12 combustion air inlet 14 blower or pump module 16, exhaust plenum 18, exhaust outlet 20 and inlet 22. In one embodiment the inlet 22 is an air inlet or first inlet, or working fluid inlet 24 to a blower 26. In a second embodiment to be described herein the inlet 22 is a water inlet 28 to a pump 40 to be described herein.

The Gas Turbine device 10 also includes an outlet or first outlet or working fluid outlet 32.

In one embodiment the outlet first outlet or working fluid outlet 32 is an air outlet 34. More particularly air through the blower inlet 24 is compressed by a blower impeller 37 and then is discharged through the blower scroll or volute channel 36.

Figure 1:
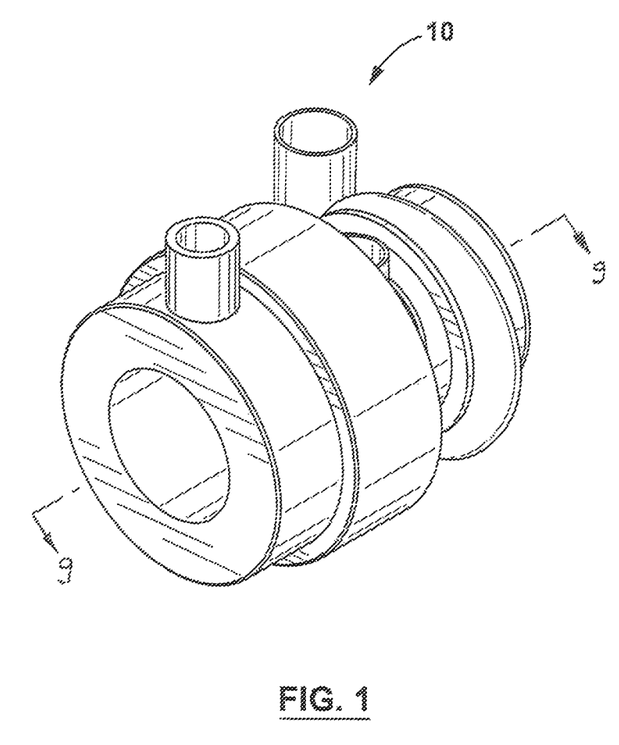
FIG. 1 is a perspective view taken from the right front side view of the Gas Turbine unit 10.
Figure 2:
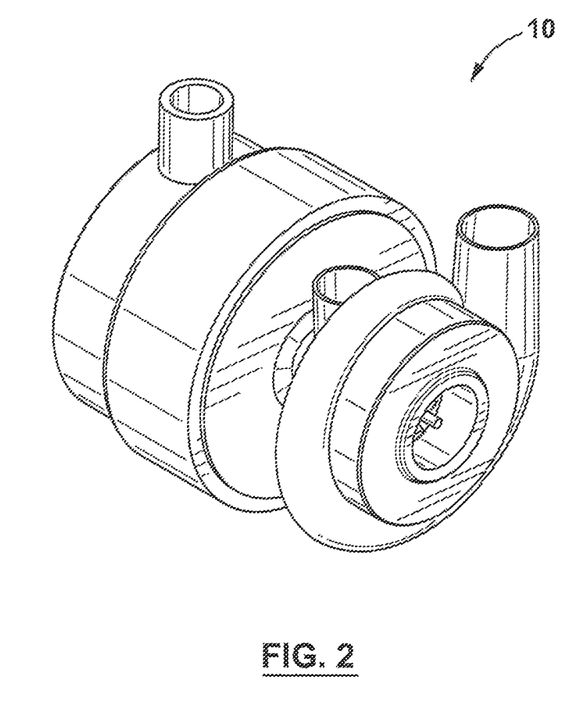
FIG. 2 is a perspective view taken from the rear right side view of the Gas Turbine unit 10.
Figure 3:
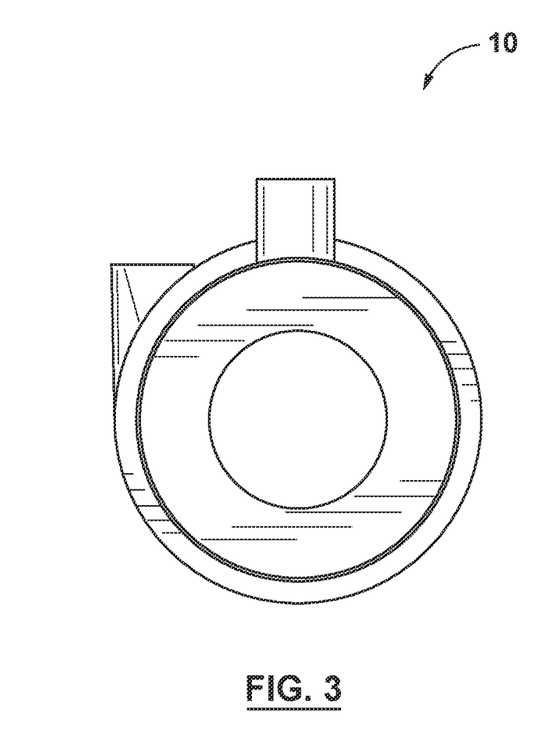
FIG. 3 is a front elevational view of the Gas Turbine unit 10.
Figure 4:
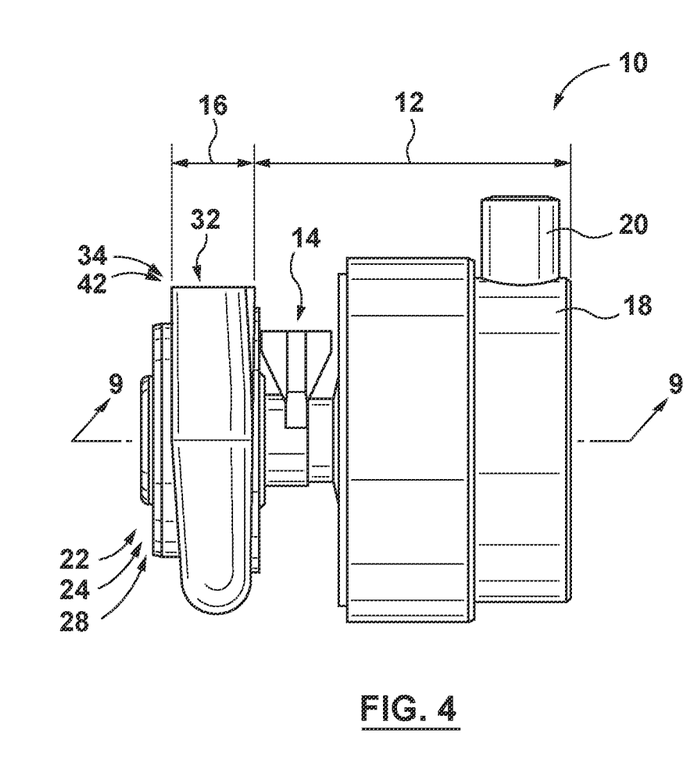
FIG. 4 is a left side elevational view of the Gas Turbine Blower unit 10.
Figure 5:
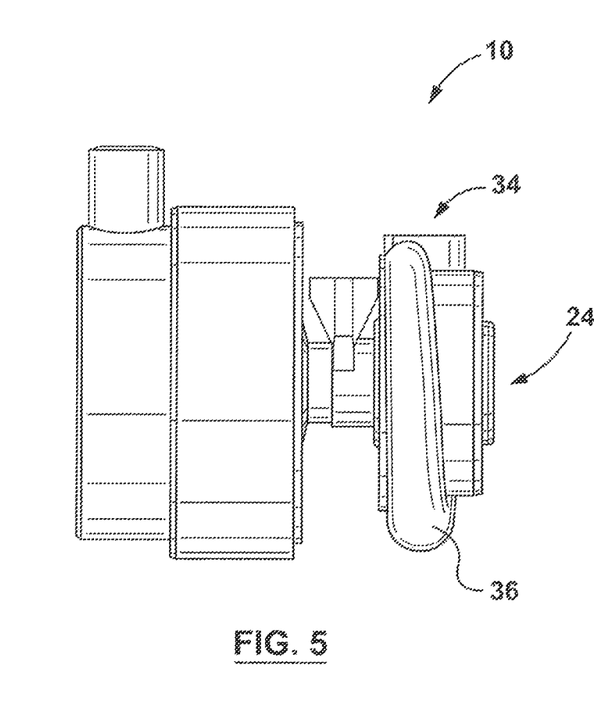
FIG. 5 is a right side elevational view of the Gas Turbine Blower unit 10.
Figure 6:
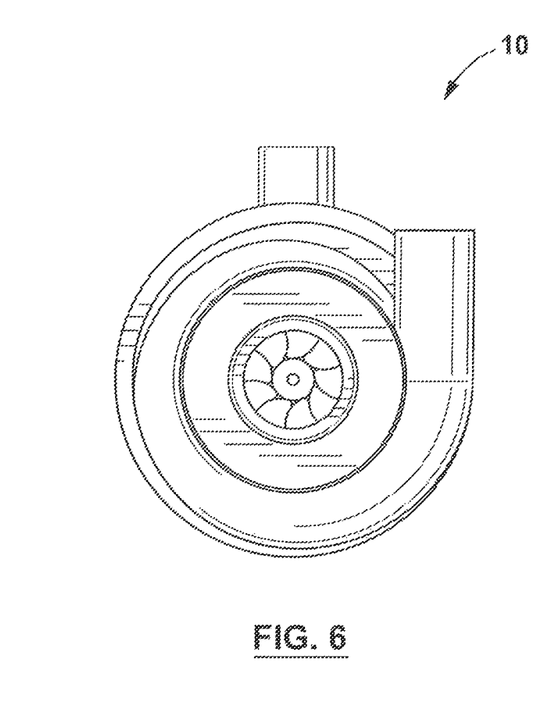
FIG. 6 is a rear elevational view of the Gas Turbine unit 10.
Figure 7:
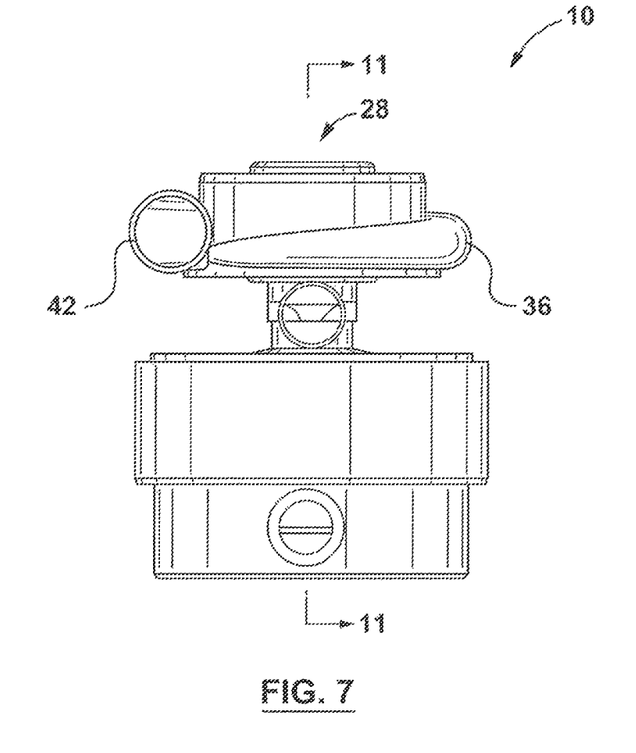
FIG. 7 is a top plan view of the Gas Turbine unit 10.
Figure 8:
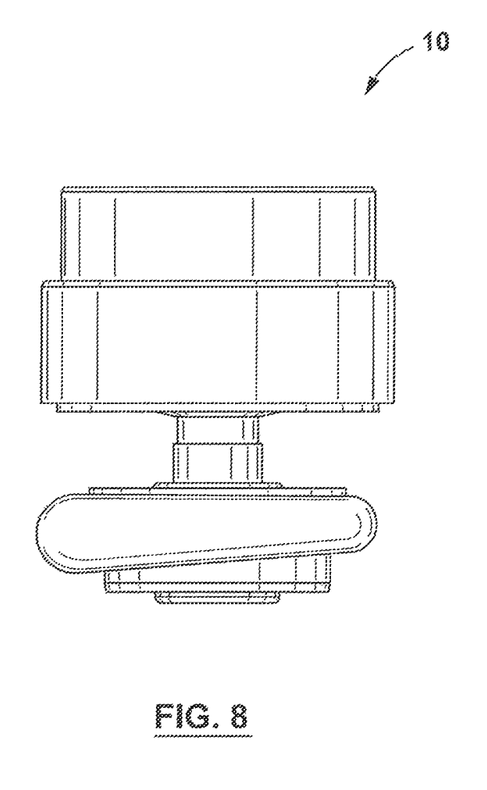
FIG. 8 is a bottom plan view of the Gas Turbine unit 10.

In another embodiment shown for example in FIG. 7 the Gas Turbine unit 10 includes a water inlet 28 a pump impeller 40 and water outlet 42.

Figure 9:
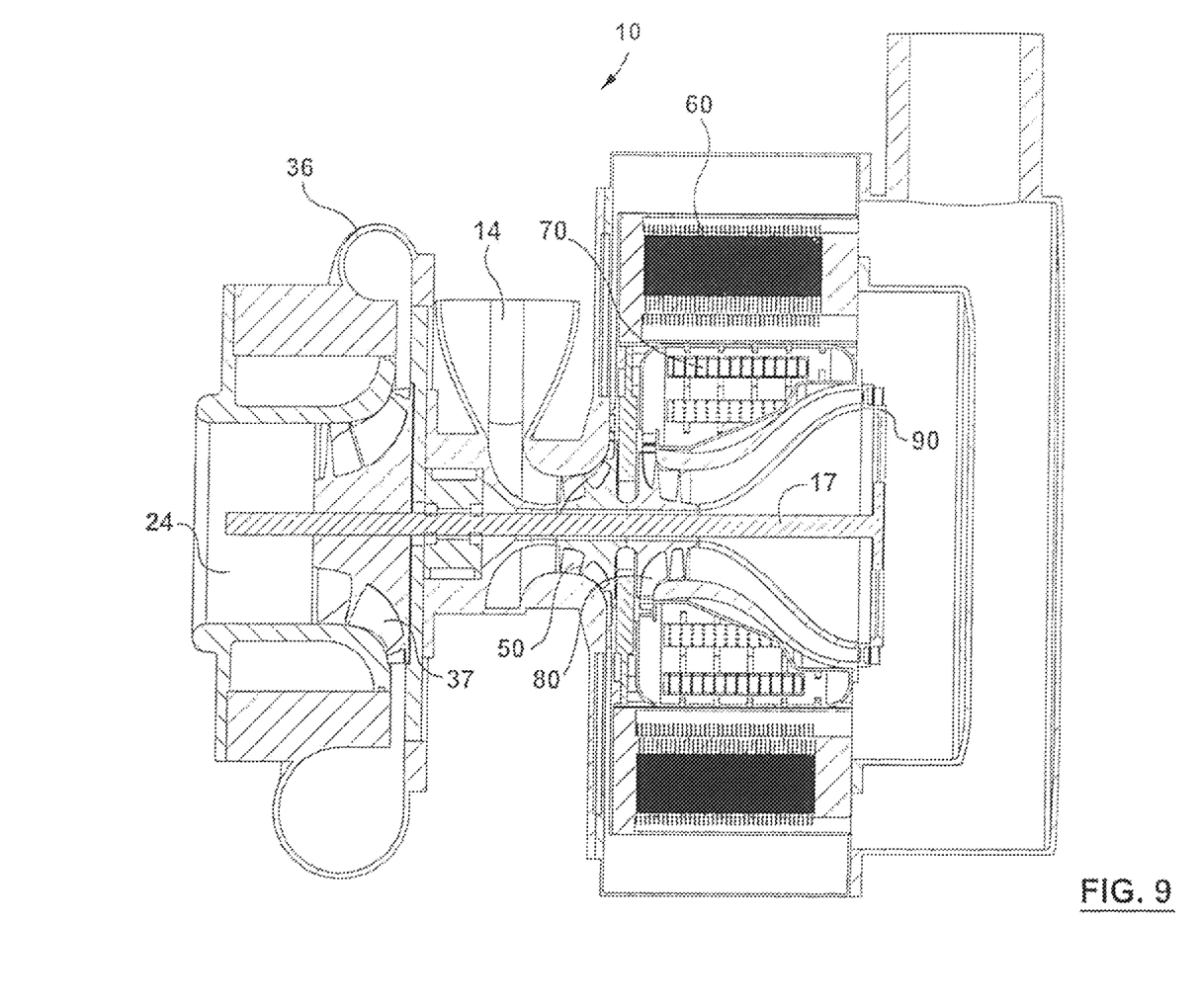
FIG. 9 is a cross sectional view of one embodiment of the invention relating to a Gas Turbine Blower unit 12 taken along lines 9-9 of FIG. 4 showing the rotors mounted in an arrangement with the main components.

The integration of the assembly as described herein not only produces an energy efficient blower/pump system 10 but also presents a unit 10 which is compact in size and design. In one embodiment the width of the unit as shown for example in FIG. 9 can be 39 inches and the height 37 inches. However such dimensions are given by way of example only as other compact sizes may be experienced depending on the size requirement to accomplish the rated flow ranging from 1,000 to 50,000 SCFM and discharge pressures from 0.5 to 1.2 atmospheres.

FIGS. 1, 2, 3, 4, 5, 6, 8, 9 and 10 illustrates one embodiment of a Gas Turbine Blower system 12 which generally includes a centrifugal blower impeller 37, a gas turbine axial and/or centrifugal compressor 50, a natural gas or biogas combustor 70, a high pressure axial and/or radial gas turbine 80, an axial and/or radial free power turbine 90 and a recuperator 60.

On the blower side, the air through the blower inlet 24 is compressed by the blower impeller 37, and then it is discharged after leaving the blower scroll 36 to outlet 34. The blower impeller 37 is driven by the free power turbine 90 through a common shaft or axis 17.

On the gas turbine side, the air passes through the inlet 14 is compressed by the compressor 50 to an elevated pressure over ambient pressure of for example 4-5 pressure ratio at which point it enters into the recuperator 60 which increases the air temperature. The heated air is burned with the fuel of natural gas/biogas in the combustor 70, and the high pressure and temperature gas is expanded in the high pressure gas turbine 80, and then the gas is expanded again in the free power turbine 90. Finally the gas is exhausted from the recuperator 60 which recovers heat to the air before combustor 70. The compressor 50 is driven by the high pressure gas turbine 80 through a common shaft or axis 2.

Figure 10:
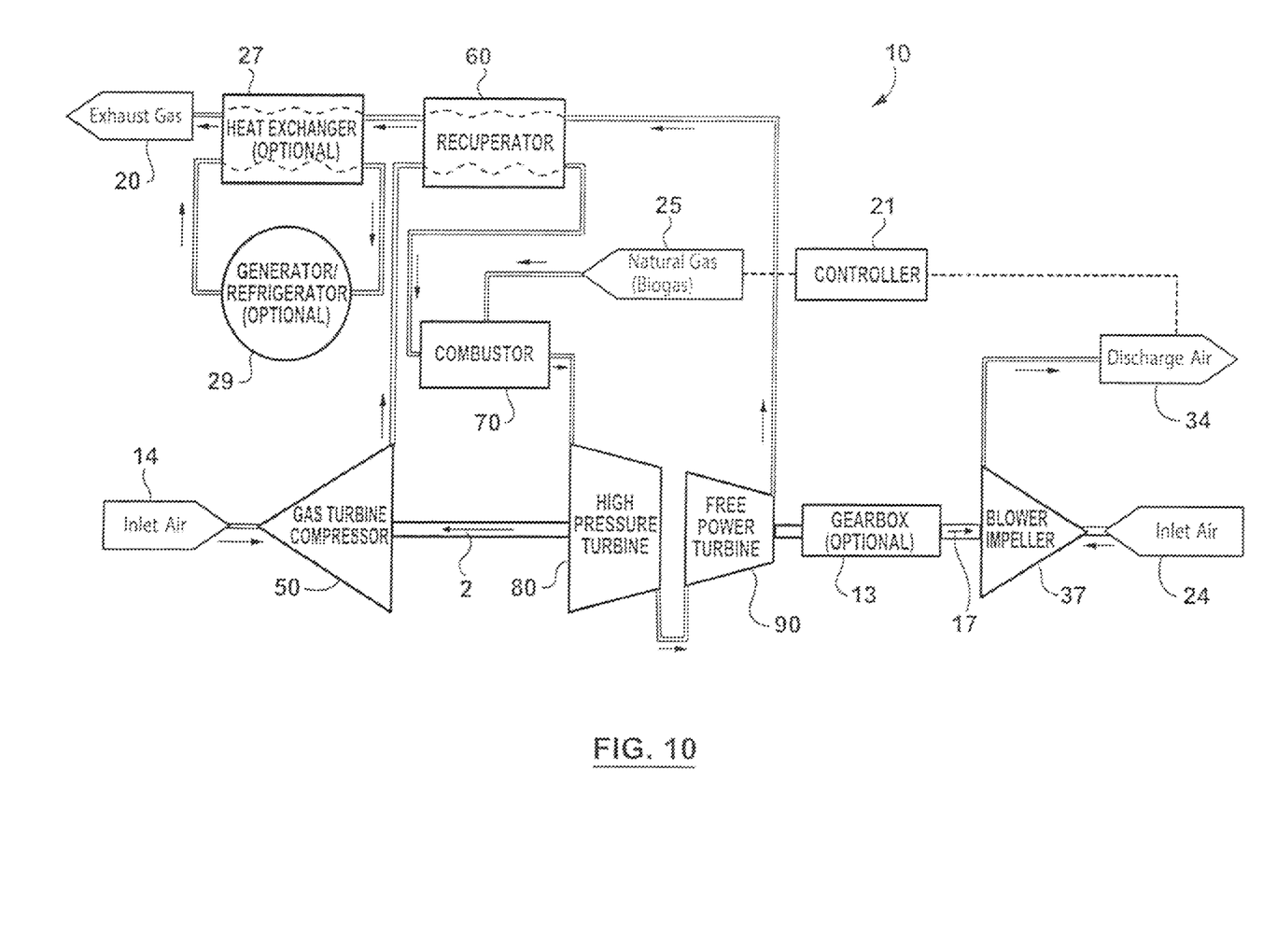
FIG. 10 is a schematic diagram of one embodiment of the Gas Turbine Blower unit, blower system shown in FIG. 9 with a gas turbine compressor driven by high-pressure gas turbine, a combustor of natural gas or biogas, a single blower impeller driven by a free power turbine and a recuperator recovering the heat from the exhaust gas that will be used to increase the gas turbine inlet temperature.
Figure 11:
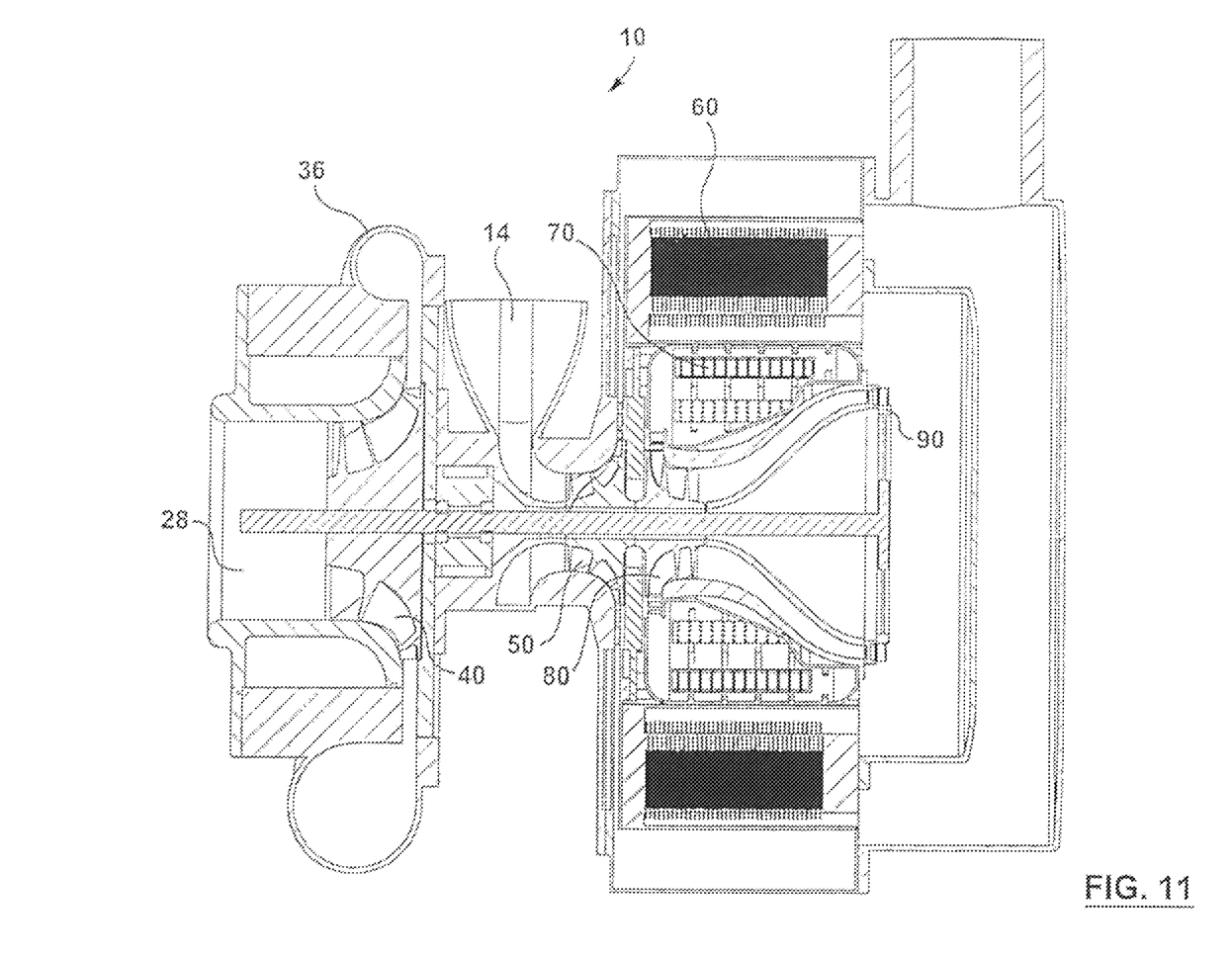
FIG. 11 is a cross sectional view of another embodiment of the invention relating to a Gas Turbine Pump unit 16 taken along lines 11-11 of FIG. 7.

FIG. 10 illustrates the one embodiment of a Gas Turbine Blower system 12 shown in FIGS. 1, 2, 3, 4, 5, 6, 8 and 9. The air flow inlet 24 of the blower 37 is in one example approximately 3000 to 15000 cubic feet per minute (CFM). The discharge air through outlet 34 in one example is 1.2-1.5 pressure ratio to a wastewater treatment system.

A free power turbine 90 provides the power to meet the requirement of working fluid. As shown in the drawing, the free turbine 90 is a single stage axial turbine, but it may be a single radial turbine or may have multiple stages of expansion.

A controller 21 such as a computer or the like is used to adjust the fuel of natural gas/biogas 25 and the air flow inlet 14 of the compressor 50 depending on the requirement of discharge air 34. In order to reduce or increase the speed of the blower impeller 37, an optional gearbox 13 can be installed on the shaft or the axis of rotation 17 between the blower 37 and free power turbine 90. In order to further increase energy efficiency, an optional heat exchanger 27 and an optional electrical generator or refrigerator system 29 can be installed at the exhaust of the recuperator 60.

FIGS. 1, 2, 3, 4, 6, 7, 8, 11 and 12 illustrates another embodiment of the invention in relation to a Gas Turbine Pump unit, device and system 16 which generally includes a pump impeller 40 a gas turbine axial and/or centrifugal compressor 50, a natural gas or biogas combustor 70, a high pressure axial and/or radial turbine 80, a axial and/or radial free power turbine 90 and a recuperator 60.

On the pump side, the water through the pump inlet 28 is compressed by the pump impeller 40, and then it is discharged after leaving the pump scroll or volute passage 36 to outlet 42. The pump impeller 40 is driven by the free power turbine 90 through a common shaft or axis 17.

Figure 12:
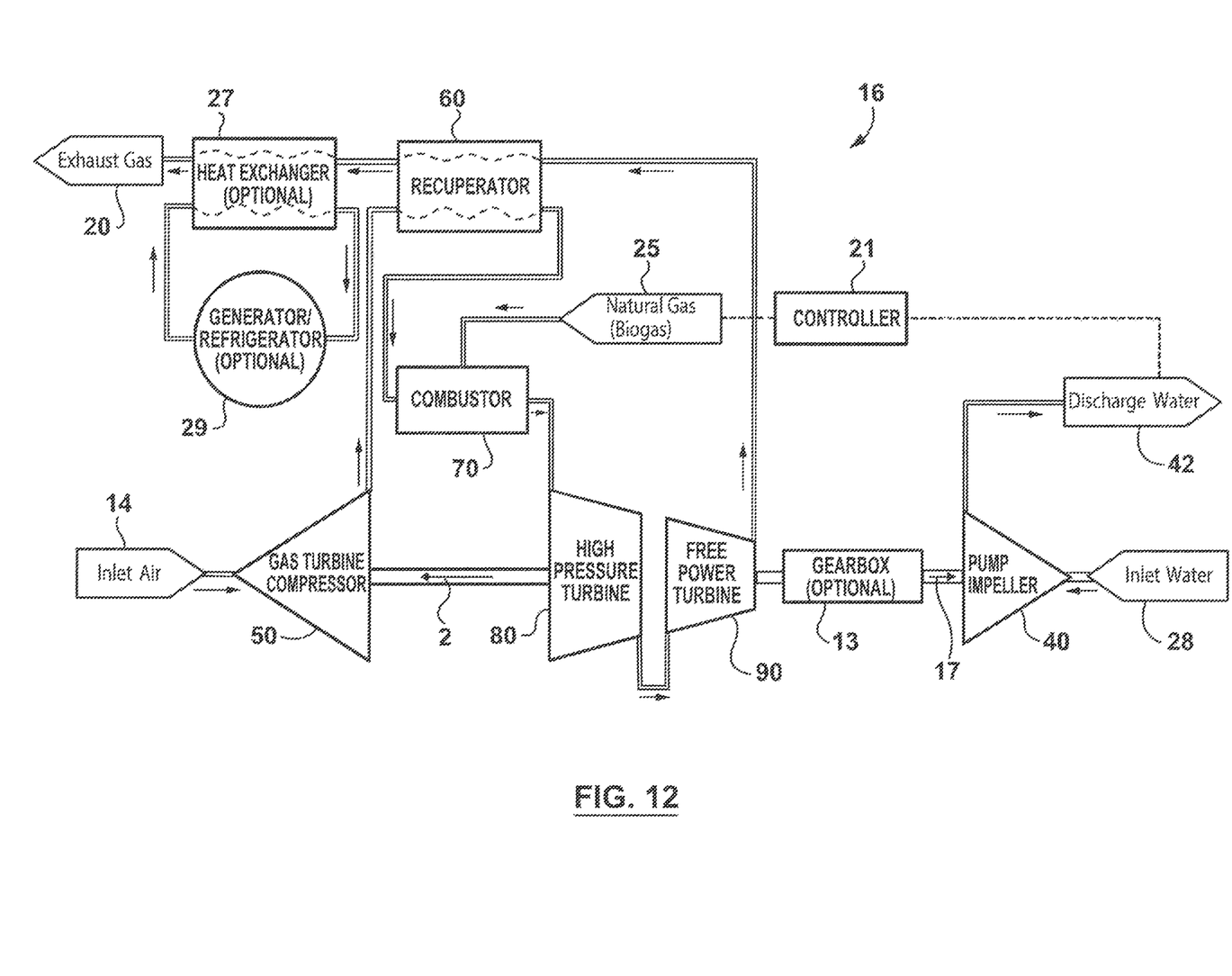
FIG. 12 is a schematic diagram of another embodiment of the Gas Turbine Pump unit, device, system shown in FIG. 11 with a gas turbine compressor driven by high pressure gas turbine, a combustor of natural gas or biogas, a single pump impeller driven by free power turbine and a recuperator recovering heat from the exhaust gas to be used to increase the gas turbine inlet temperature.

FIG. 12 illustrates the embodiment of the invention described in FIGS. 1, 2, 3, 4, 6, 7, 8, 11 relating to the Gas Turbine Pump unit, device and system 16 with other options on a block diagram. The water flow inlet 28 of the pump impeller 40, for example can be approximately 15,000 to 50,000 gallon per minute (GPM), the discharge water through outlet 42 is provided with varying pressure ratio to meet the requirements of a wastewater treatment system. The controller 21 is used to adjust the fuel of natural gas/biogas 25 and the air flow inlet 14 of the compressor 50 depending on the requirement of discharge water through outlet 42. In order to reduce or increase the speed of pump impeller 40, an optional gearbox 13 can be installed on the shaft or axis 17 between the pump 40 and free power turbine 90. In order to further increase energy efficiency, an optional heat exchanger 27 and an optional electrical generator or refrigerator system 29 can be installed at the exhaust of the recuperator 60.

Figure 13:
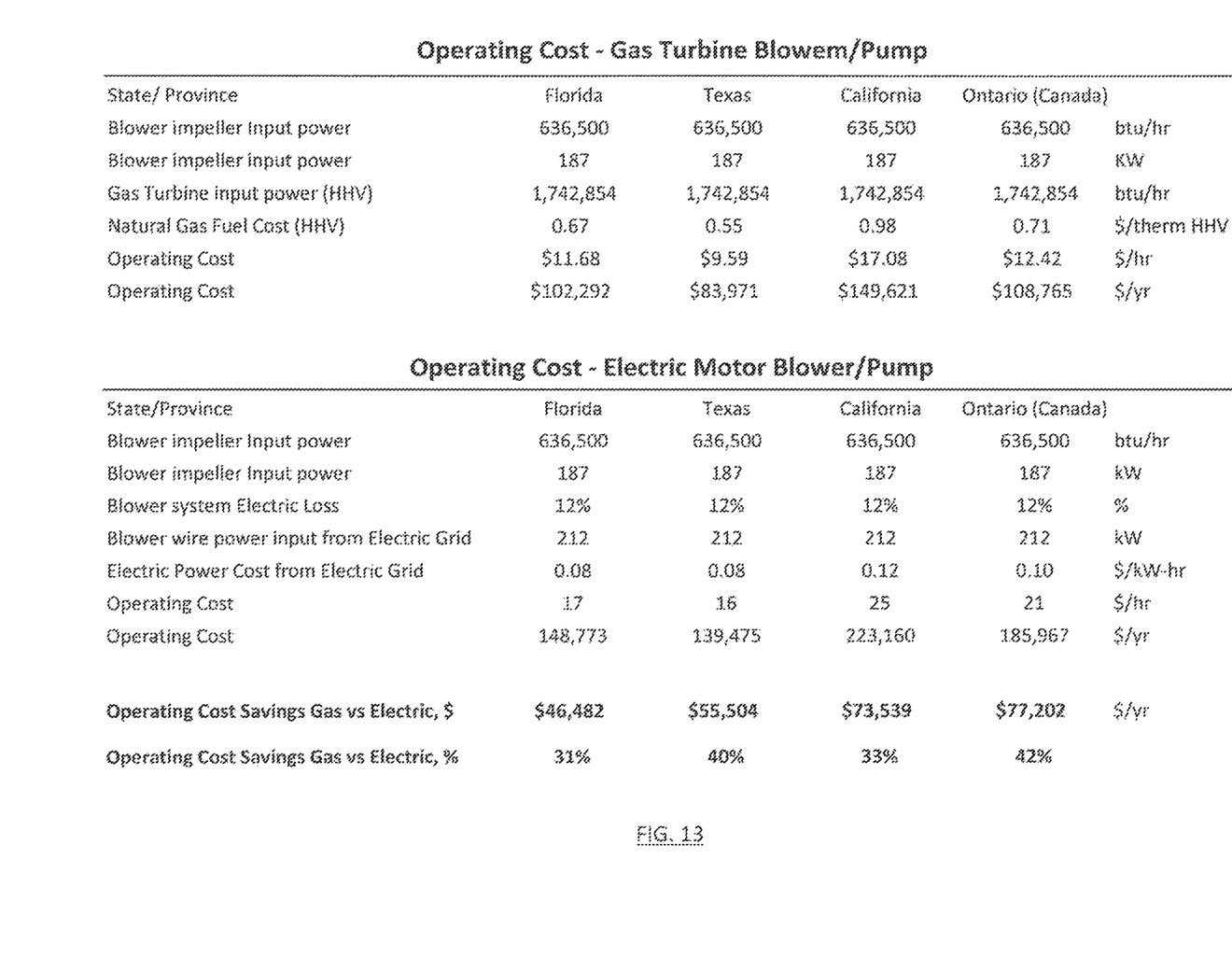
FIG. 13 is a chart illustrating one example of the efficiency and cost savings of this invention.

Furthermore FIG. 13 is a chart which illustrates the efficiency and cost savings by utilizing the gas turbine system 10 as described herein versus a traditional electric motor option of traditional methods used before.

In particular FIG. 13 illustrates one example of the operating costs of the electric motor option in several states namely Florida, Texas and California versus the operating costs of the Gas Turbine system 10 as described herein for the same locations in Florida, Texas and California which showed a savings of 31% in costs in Florida, 40% savings in costs in Texas and 33% savings in costs in California to run the systems with natural gas; based on the current cost of electricity and the historically high level cost of natural gas prices. The savings will be significantly higher when biogas is added to natural gas and more so if the system is operated with only biogas.

The invention claimed is:

1. A unit having:
(a) a working fluid inlet and working fluid outlet;
(b) an air inlet and an exhaust outlet;
(c) an impeller disposed between said working fluid inlet and said working outlet;
(d) a compressor for elevating the pressure of air; wherein the compressor is driven by a high pressure turbine through a first common shaft;
(e) a recuperator for increasing the temperature of said air at said elevated pressure;
(f) a gas turbine disposed between said air inlet and said exhaust outlet, where the gas turbine comprises the high pressure turbine and a free power turbine;

(g) a combustor for receiving a combustion mixture comprising said air at said elevated temperature and said elevated pressure, and fuel to drive said gas turbine and exhaust through said exhaust outlet;

(h) said free power turbine driven by exhaust gases from said high pressure gas turbine;

(i) said recuperator recovering heat from the exhaust gases from said free power turbine to preheat said combustion mixture;

(j) said free power turbine and said impeller connected on a second shaft so as to drive said impeller and move said working fluid from said working fluid inlet to said second working fluid outlet.

2. A The unit as claimed in claim 1 wherein said impeller is an air blower when said working fluid is air.

3. The unit as claimed in claim 1 wherein said impeller is a pump when said working fluid is water.

4. The unit as claimed in claim 3 wherein said fuel is selected from a group of natural gas and biogas.

5. The unit as claimed in claim 4 including a gearbox disposed between said impeller and said turbine.

6. The unit as claimed in claim 5 including a heat exchanger.

7. A The unit as claimed in claim 6 including an electric generator or refrigerator.

8. An integrated gas turbine unit comprising:

(a) a working fluid inlet and working fluid outlet;

(b) an impeller disposed between said working fluid inlet and said working fluid outlet;

(c) an air inlet and exhaust outlet;

(d) a compressor for elevating the pressure of air;

(e) a recuperator for increasing the temperature of said air at said elevated pressure;

(f) a high pressure gas turbine disposed between said air inlet and said exhaust outlet;

(g) a combustor disposed between said air inlet and said exhaust outlet for combusting a mixture of said air at said elevated pressure and said elevated temperature and fuel to drive said high pressure gas turbine; and (h) a free power gas turbine driven by exhaust gases from said high pressure gas turbine;

(i) said recuperator recovering heat from exhaust gases from said free power gas turbine to preheat said combustion mixture comprising said air at said elevated temperature and said elevated pressure, and fuel; and (j) a shaft having an axis of rotation, said free power gas turbine and impeller connected to said shaft so as to move said working fluid between said working fluid inlet and said working fluid outlet.

9. The integrated gas turbine unit as claimed in claim 8 wherein said impeller comprises a blower and said working fluid comprises air.

10. The integrated gas turbine unit as claimed in claim 8 wherein said impeller comprises a pump and said working fluid comprises water.

11. The integrated gas turbine unit as claimed in claim 8 including a gearbox to selectively change the rotation of said impeller.

12. The integrated gas turbine unit as claimed in claim 11 wherein said fuel includes natural gas and/or biogas and a controller to adjust the ratio of said natural gas and/or said biogas and said air.

13. The integrated gas turbine unit as claimed in claim 8 comprising:

(a) a housing extending along a longitudinal axis presenting a first end and a second end;

(b) said working fluid inlet axially disposed at said first end of said housing;

(c) said working fluid outlet disposed radially outwardly from said housing adjacent said first end;

(d) said air inlet disposed radially inwardly from said housing between said first end and said second end; and (e) said exhaust outlet disposed radially outwardly from said housing at said second end.

14. A method of driving an impeller with a free power gas turbine in a comprising:

(a) coaxially connecting an impeller and said free power gas turbine along a shaft;

(b) rotatably driving said free power gas turbine by combusting a mixture of air and fuel in a high pressure gas turbine and directing the exhaust from said high pressure gas turbine to said free power gas turbine so as to rotationally drive said free power gas turbine; said free power gas turbine rotationally driving said impeller along another shaft; and (c) capturing waste heat from said free power gas turbine with a recuperator to preheat said air; and (d) positioning said impeller between a working fluid inlet and working fluid outlet.

15. The method as claimed in claim 14 wherein said impeller comprises a blower when said working fluid is air.

16. The method as claimed in claim 14 wherein said impeller comprises a pump when said working fluid is water.

17. The method as claimed in claim 14 wherein said fuel is bio fuel.

* * * * *